UNITED STATES PATENT OFFICE.

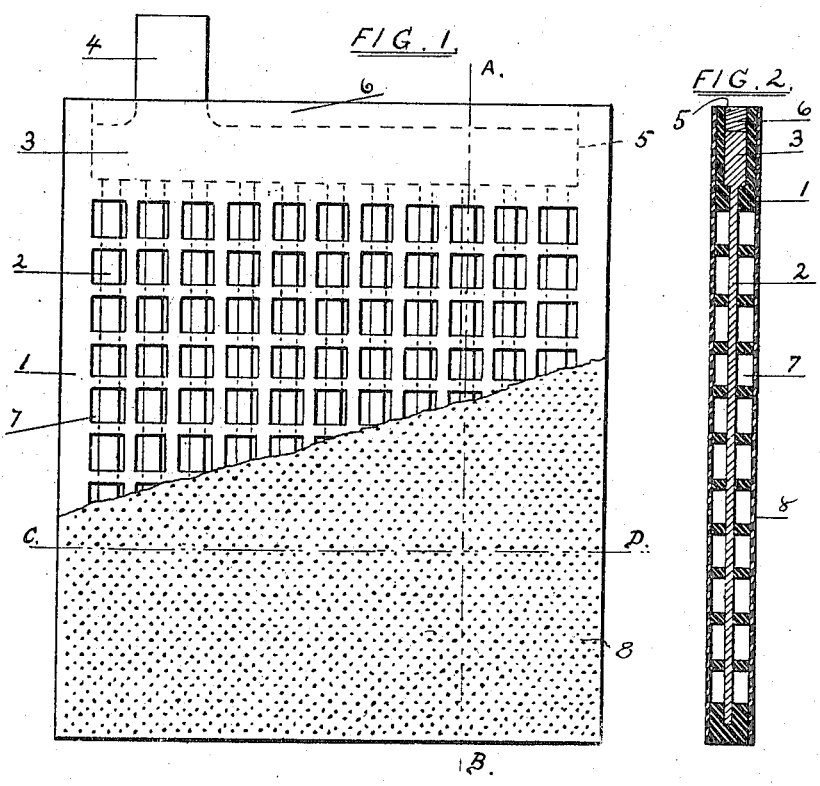

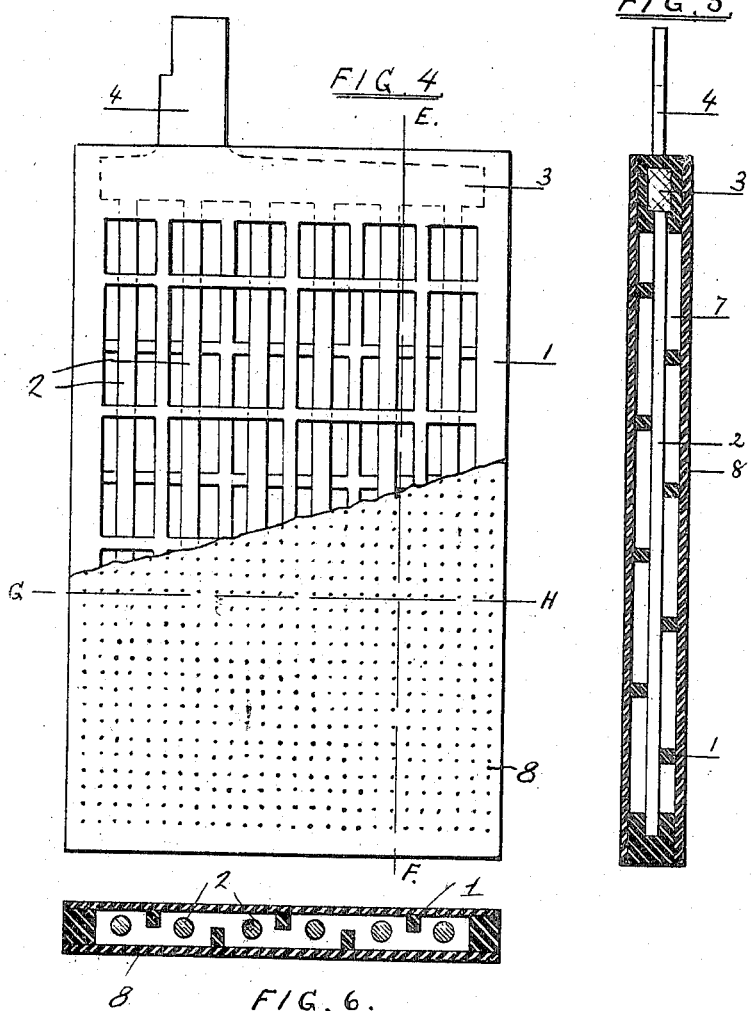

EUGENE HANDLER, OF BALTIMORE, MARYLAND, ASSIGNOR TO GENERAL INDUSTRIES COMPANY, A CORPORATION OF NEW YORK.

SECONDARY-BATTERY ELEMENT.

1,158,491.  Specification of Letters Patent.  Patented Nov. 2, 1915.

Application filed May 2, 1913. Serial No. 765,091.

*To all whom it may concern:*

Be it known that I, EUGENE HANDLER, a citizen of the United States, residing at Baltimore city, in the State of Maryland, have invented a new and useful Secondary-Battery Element, of which the following is a specification.

My invention relates to improvements in secondary battery elements, and the object of my improvement is the providing of a secondary battery element of great durability.

A further object of my improvement is the providing of a secondary battery element, in which the active material may be uniformly active.

A further object of my improvement is the incasing in a non-conducting cell, active material, having means provided to conduct the electrical current from the interior of said active material from each cell to a common point.

A further object of my improvement is the providing of a secondary battery element free from buckling tendency, thereby enabling the same to be easily maintained in proper position.

A further object of my improvement is the providing of a secondary battery element containing cells of active material with a perforated insulated protector over the said active material secured to the edges of a plurality of the said cells.

With the foregoing and other objects in view my invention consists of the novel construction, combination and arrangement of parts as herein specifically described and illustrated in the drawings wherein is shown the preferred embodiment of my invention, but it is to be understood that changes, variations and modifications can be resorted to which come within the scope of the claims hereunto appended.

In the drawing of the herein described embodiment of my invention; Figure 1, shows a secondary battery element in elevation with a part of the perforated plate broken away. Fig. 2, is a sectional view taken through "A B" of Fig. 1, Fig. 3, is a sectional view taken through "C D" of Fig. 1. Fig. 4, shows a modified form of the cellular construction; Fig. 5, is a sectional view taken through "E F" of Fig. 4; Fig. 6, is a sectional view taken through "G H" of Fig. 4. The modified form shown in Figs. 4, 5, and 6 allows the active material of the various cells to become united together in parts, thus forming all into one contiguous mass.

Similar numerals refer to similar parts throughout the several views.

1 is the grid, preferably of insulating material, such as vulcanite, celluloid or other suitable material, but I do not wish to limit myself to any particular material, either conducting or nonconducting.

2 are the conducting rods or ribbons passing within the grid 1 and through the active material of each cell. Rods or ribbons 2 are formed into conducting head 3.

4 is the conductor attached to conducting head 3. Head 3 is in the groove or recess 5 in grid 1 and is cemented into the same by cement 6 as shown in Fig. 2, or is vulcanized into the same as shown in Fig. 5, thus entirely protecting the same from the electrolytic fluid.

7 are the cells in grid 1, in which the active material is formed around conducting ribbons or rods 2.

8 is the perforated face plate, made of any suitable material of an insulating character, and is secured to grid 1 preferably around each cell, but I do not wish to limit myself to any particular mode or method of securing the same to said grid.

In this specification, when the term cell is used, I do not wish to limit myself to any particular shape, and when the term perforated is used I mean having openings, whereby the electrolytic fluid may be permitted to pass through the same and the openings may consist of holes, slits or other character of openings and when the term impervious is used I mean impervious to the electrolytic fluid.

In the modified form shown in Figs. 4, 5 and 6 the grid and face plate are both made of vulcanite and are vulcanized together at the points of securing. The conducting head 3 being vulcanized into grid 1 and entirely incased thereby. The active material in the cells shown in Figs. 4, 5 and 6 is joined together, but I do not wish to limit myself to any particular cellular construction. The elements may be made up complete with the conductor secured in the grid and the face plate secured in place, and the active material sifted through the same into the cells and then properly treated and formed; or the active material may be put into the cells and the face plate put in place and secured afterward. I do not wish to limit myself to any particular process or mode of assembling or forming the elements.

Having thus described my invention, what I claim and desire to secure by Letters Patent is—

1. A secondary battery element consisting of, a non-conducting impervious integral grid containing active material, active material within said grid, a conductor extending with said active material, and a pervious non-conducting face plate secured to said grid.

2. A secondary battery element consisting of an integral impervious cellular non-conducting grid, active material in the cells of said grid, a metallic conductor within said active material and inclosed by said grid, and a pervious non-conducting face plate covering said active material in said cells and formed integral with said grid.

3. A secondary battery element consisting of, a plurality of attached and abutting cells, each cell consisting of an integral non-conducting envelop for active material presenting a face pervious to an electrolyte, active material within said cells and an electric conductor leading from each of said cells to a common point.

EUGENE HANDLER.

Witnesses:
 DANL. F. REISENWEBER,
 JOHN A. RICHARDSON.